United States Patent
Tabatabaei

(10) Patent No.: US 8,836,251 B2
(45) Date of Patent: Sep. 16, 2014

(54) DRIVE SYSTEM AND MACHINE
(75) Inventor: Nejat Mahdavi Tabatabaei, Lindau (DE)
(73) Assignee: Liebherr-Components Biberach GmbH, Biberach an der Riss (DE)
( * ) Notice: Subject to any disclaimer, the term of this patent is extended or adjusted under 35 U.S.C. 154(b) by 202 days.
(21) Appl. No.: 13/580,747
(22) PCT Filed: Feb. 18, 2011
(86) PCT No.: PCT/EP2011/000799
§ 371 (c)(1),
(2), (4) Date: Nov. 5, 2012
(87) PCT Pub. No.: WO2011/103987
PCT Pub. Date: Sep. 1, 2011
(65) Prior Publication Data
US 2013/0038249 A1 Feb. 14, 2013
(30) Foreign Application Priority Data
Feb. 23, 2010 (DE) .......... 10 2010 008 917
(51) Int. Cl.
*B23Q 5/28* (2006.01)
*B60L 11/18* (2006.01)
*B60L 1/00* (2006.01)
*H01M 8/04* (2006.01)
*H01M 16/00* (2006.01)
*H02J 7/14* (2006.01)
*B60L 11/00* (2006.01)
*H02J 7/34* (2006.01)
*H01M 8/06* (2006.01)
*H02J 1/00* (2006.01)
(52) U.S. Cl.
CPC .......... *H02J 7/1423* (2013.01); *B60L 11/1887* (2013.01); *Y02T 10/92* (2013.01); *H02J 7/345* (2013.01); *B60L 1/20* (2013.01); *Y02T 10/7022* (2013.01); *B60L 11/1881* (2013.01); *H01M 8/0612* (2013.01); *Y02T 90/32* (2013.01); *H01M 2250/00* (2013.01); *H02J 2001/004* (2013.01); *Y02T 10/7216* (2013.01); *B60L 2200/40* (2013.01); *H01M 8/04865* (2013.01); *Y02T 90/34* (2013.01); *H01M 16/003* (2013.01); *B60L 2210/10* (2013.01); *Y02E 60/50* (2013.01); *H01M 2250/20* (2013.01); *B60L 11/005* (2013.01)
USPC ............. 318/39; 320/101; 320/166; 320/167; 320/156; 318/375; 318/376

(58) Field of Classification Search
CPC ........................................................ H02P 1/00
USPC ........... 318/39, 139, 800, 801, 362, 374, 375, 318/376; 363/40, 55, 56.03, 71, 120; 320/101, 127, 156, 166, 167; 56/72; 104/98; 105/163.1; 212/277, 284, 307; 187/297
See application file for complete search history.

(56) References Cited

U.S. PATENT DOCUMENTS

| | | | |
|---|---|---|---|
| 6,688,481 B1 | 2/2004 | Adner et al. | |
| 7,554,278 B2 * | 6/2009 | Wegner-Donnelly et al. | 318/375 |
| 8,138,720 B2 * | 3/2012 | Snyder et al. | 320/127 |
| 2002/0172847 A1 | 11/2002 | Aoyagi et al. | |
| 2003/0118876 A1 | 6/2003 | Sugiura et al. | |
| 2005/0249985 A1 | 11/2005 | Muller et al. | |
| 2006/0127704 A1 | 6/2006 | Raiser | |

FOREIGN PATENT DOCUMENTS

| | | |
|---|---|---|
| EP | 1090874 | 4/2001 |
| JP | 2003-276983 | 10/2003 |
| JP | 2006-236619 | 9/2006 |
| JP | 2006-318818 | 11/2006 |

* cited by examiner

*Primary Examiner* — Antony M Paul
(74) *Attorney, Agent, or Firm* — Dilworth & Barrese, LLP.

(57) ABSTRACT

The present invention relates to a drive system with energy recovery for driving a machine, in particular for driving a crane, wherein the drive system includes at least one fuel cell unit, at least one capacitive energy storage unit and at least one drive motor, and wherein the fuel cell unit and the energy storage unit are connected in parallel and feed at least one drive motor. According to the invention, the capacitive energy storage unit is dimensioned such that the differential voltage occurring during operation between the fuel cell unit and the capacitive energy storage unit is minimized to such an extent that the current caused by the voltage within the parallel connection of fuel cell unit and energy storage unit does not exceed a defined safe limit value, wherein the fuel cell unit and the energy storage unit are directly coupled with each other and with the remaining drive components without DC/DC converter. The invention furthermore relates to a machine which includes the drive system according to the invention.

20 Claims, 3 Drawing Sheets

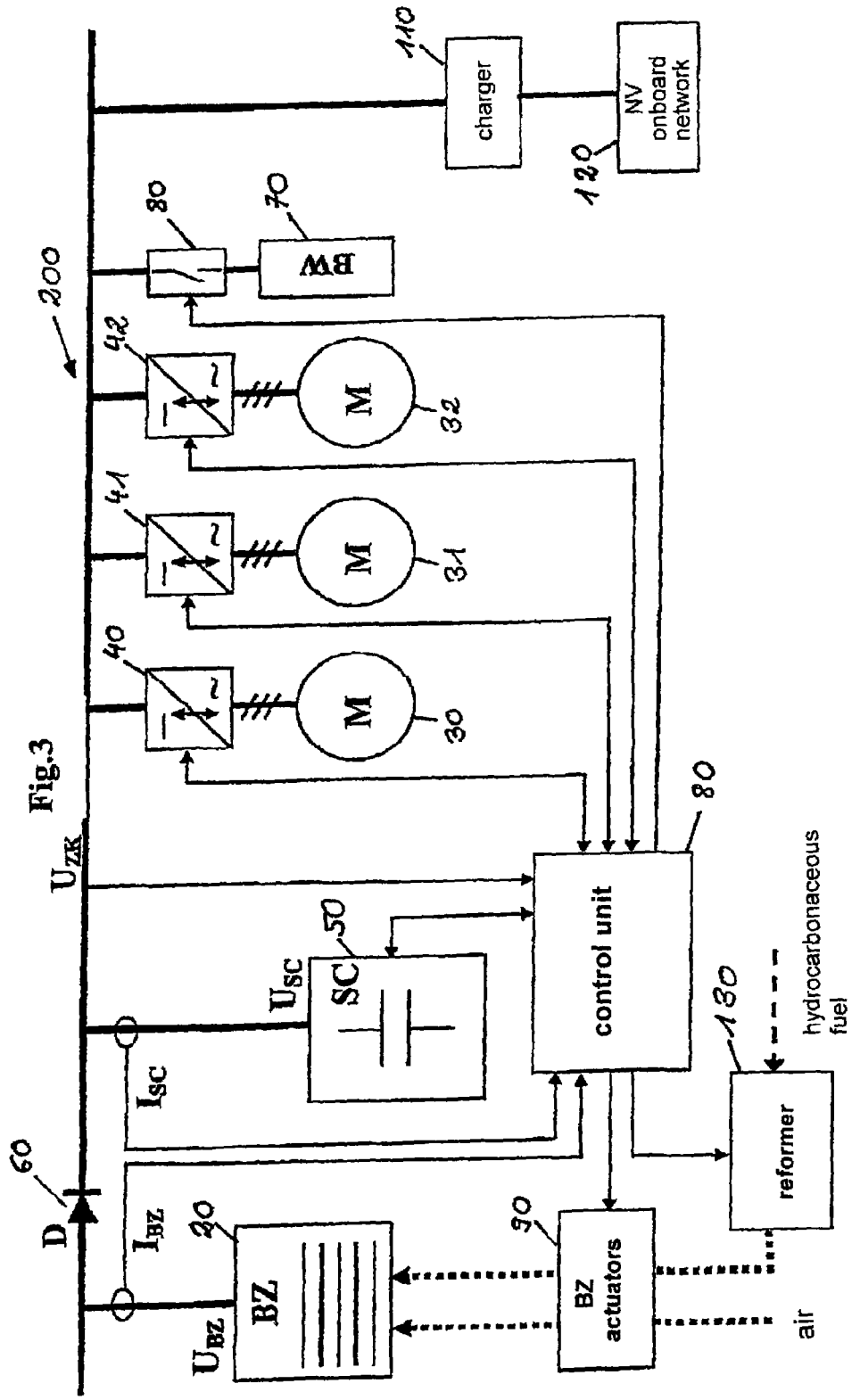

DRIVE SYSTEM AND MACHINE

The present invention relates to a drive system with energy recovery for driving a machine, wherein the drive system includes at least one fuel cell unit, at least one capacitive energy storage unit and at least one drive motor. Furthermore, the present invention relates to a machine with such drive system.

Currently known machines, in particular cranes, generally include a drive system which at least consists of a drive motor for operating a hoisting gear or for driving a traveling gear. For the energy supply of the drive system a diesel generator unit is available, which is utilized as primary energy source.

Drive systems which rely on a fuel cell unit as energy source currently are employed in the motor vehicle sector. Instead of the internal combustion engine, a fuel cell is available, which supplies the electric motor of the drive system with energy. For energy recovery, an electric energy accumulator is available for storing the recovered energy. During the braking operation, for example, the kinetic energy of the vehicle is converted into electric energy by means of the electric motor, which operates as generator, and taken up by the electric energy accumulator. The electric energy accumulator often not only serves for storing the electric energy, but rather is intended to support the fuel cell during occurring voltage peaks or load peaks. For this purpose, the fuel cell and the electric energy accumulator each are connected with the drive unit via a DC/DC converter.

It is the object of the present invention to simplify a known drive system by specific measures and render the same less expensive. Furthermore, the object of the present invention consists in developing a known machine, in order to provide for a more economic and environmentally sounder operation.

The present object is solved by a drive system with energy recovery for driving a machine with the features herein of claim 1. Accordingly, the drive system includes at least one fuel cell unit, at least one capacitive energy storage unit and at least one drive motor. For realizing the energy recovery, a parallel connection of the fuel cell unit and the energy storage unit is provided, wherein the components of the parallel connection selectively feed the drive motor with energy at the same time or separately.

The electric energy storage unit is provided for energy recovery. The drive system according to the invention for example serves as crane drive, so that an energy recovery can be achieved while lowering a suspended load. For this purpose, the drive motor of the hoisting gear operates as generator which charges the electric energy storage unit while lowering the load. What is also conceivable is the energy recovery from a braking operation of the crane. The energy supply of the drive motor of the crane according to the invention can completely or at least partly be effected from the energy storage unit.

It is conceivable that the fuel cell unit supplies the drive motor with energy only at times with high load peaks in support of the energy storage unit. Preferably, a reverse realization also is possible, which provides the energy storage unit as supporting energy source. Furthermore, it can be provided that the energy storage unit can be charged by means of the fuel cell unit in particular during breaks in operation of the drive system.

For realizing the solution according to the invention, the expensive and bulky DC/DC converters for the mutual decoupling of the two energy sources are omitted. Since fuel cell unit and capacitive energy storage unit have different voltage profiles, the direct parallel connection of these units leads to an increased load of the two components. The different component characteristic of the two components leads to the fact that a different voltage drop, in particular at full load, is obtained at the components. Since the internal resistances of the energy storage unit and the fuel cell unit, respectively, are very low, the occurring voltage difference between the two components causes a considerable current in the parallel connection, which possibly leads to the destruction of individual components.

According to the invention, the drive system provides that the capacitive energy storage unit is dimensioned such that the charging current of the energy storage unit or the current generated by the fuel cell unit lie below a specified threshold. Accordingly, the electric energy storage unit is designed such that the occurring differential voltage between the two components is minimized to such an extent that the current caused by the voltage within the parallel connection does not exceed a defined safe limit value. By means of the circuit arrangement of the drive system according to the invention, the use of the bulky and expensive DC/DC converters can completely be omitted.

It is conceivable that the capacitive energy storage unit is a supercapacitor unit. The dimensioning of the capacitor unit for minimizing the occurring differential voltage between the voltage drops on fuel cell unit and capacitor unit substantially is determined by the capacitance of the capacitor unit used. Accordingly, the capacitance of the supercapacitor unit is dimensioned such that the occurring charging current does not exceed an admissible maximum value.

To avoid the feeding back of energy into the fuel cell unit during the generator mode of the drive motors, a diode module preferably is connected in series with the fuel cell unit. By aligning the diode in blocking direction, a current flow from the drive motor to the fuel cell unit is excluded.

It is conceivable that one or more separate electric energy accumulators or energy consumers are provided within the drive system. The separate electric energy accumulators or consumers serve the supply of arbitrary electric components of the machine, which are not integrated in the drive system. Examples include the supply of a low voltage on-board network. Particularly preferably, the separate electric energy accumulator of an on-board network is charged via an interposed charger by means of the intermediate circuit voltage of the drive system according to the invention. Intermediate circuit voltage is understood to be the voltage applied between parallel connection and drive motor or interposed inverter.

To prevent a destruction of the drive system in the case of a completely charged energy storage unit, a switchable braking resistor advantageously is provided, which consumes the excess electric energy or in particular releases the same as thermal energy. The braking resistor can be coupled into the supply network of the drive system by means of an interposed switching unit only when necessary.

What is expedient is the use of a central control unit which performs the control of the intermediate circuit voltage generated by the drive system for feeding the drive motors. For this purpose, the control unit influences the energy generation of the fuel cell unit via existing actuators within the fuel cell unit. Particularly preferably, the central control unit is configured such that the control of the intermediate circuit voltage is effected in dependence on the load profile generated by the drive motors. Furthermore, further operating parameters of the drive system, such as the maximum admissible load of the fuel cell unit and/or the current charging condition of the supercapacitor unit, expediently can be included in the performed control.

To provide for an alternative supply of the drive system according to the invention with substitute fuels, the fuel cell unit advantageously comprises a reformer. As a result, a supply of the fuel cell unit with conventional fuels, in particular with hydrocarbonaceous gases or liquids instead of the direct feeding of hydrogen is conceivable.

The present invention furthermore relates to a machine with a drive system for operating the machine, wherein the drive system is configured according to the description herein. The fuel cell unit for the energy supply of the machine has a distinctly higher efficiency than known diesel generators. In addition, the fuel cells of the fuel cell unit do not produce any pollutant emissions. Furthermore, the operating noise level of the machine according to the invention is reduced considerably, since the energy generation of the fuel cell unit does not cause any operating noise. Omitting the expensive and bulky DC/DC converters involves a considerable saving in production costs.

It is conceivable that the fuel cell unit used represents the primary energy source of the drive system of the machine. It is possible that the machine includes one or more alternative energy sources for supplying the drive system, wherein the greatest amount of energy however is obtained by the fuel cell unit. In contrast to this, a complete supply of the drive system by means of the at least one fuel cell unit is of course conceivable. Particularly preferably, the energy storage unit represents the primary energy source and is supported by the fuel cell unit merely in the alternative during load peaks.

In a particularly preferred aspect of the invention the machine is a crane, in particular a container or deck crane which includes the drive system according to the invention.

BRIEF DESCRIPTION OF THE DRAWINGS

Further features, details and advantages of the invention will be explained in detail with reference to the exemplary embodiments illustrated in the drawings, in which:

FIG. 3: shows a circuit diagram of an alternative configuration possibility of the drive system according to the invention.

DESCRIPTION OF THE PREFERRED EMBODIMENTS

Figure 1:
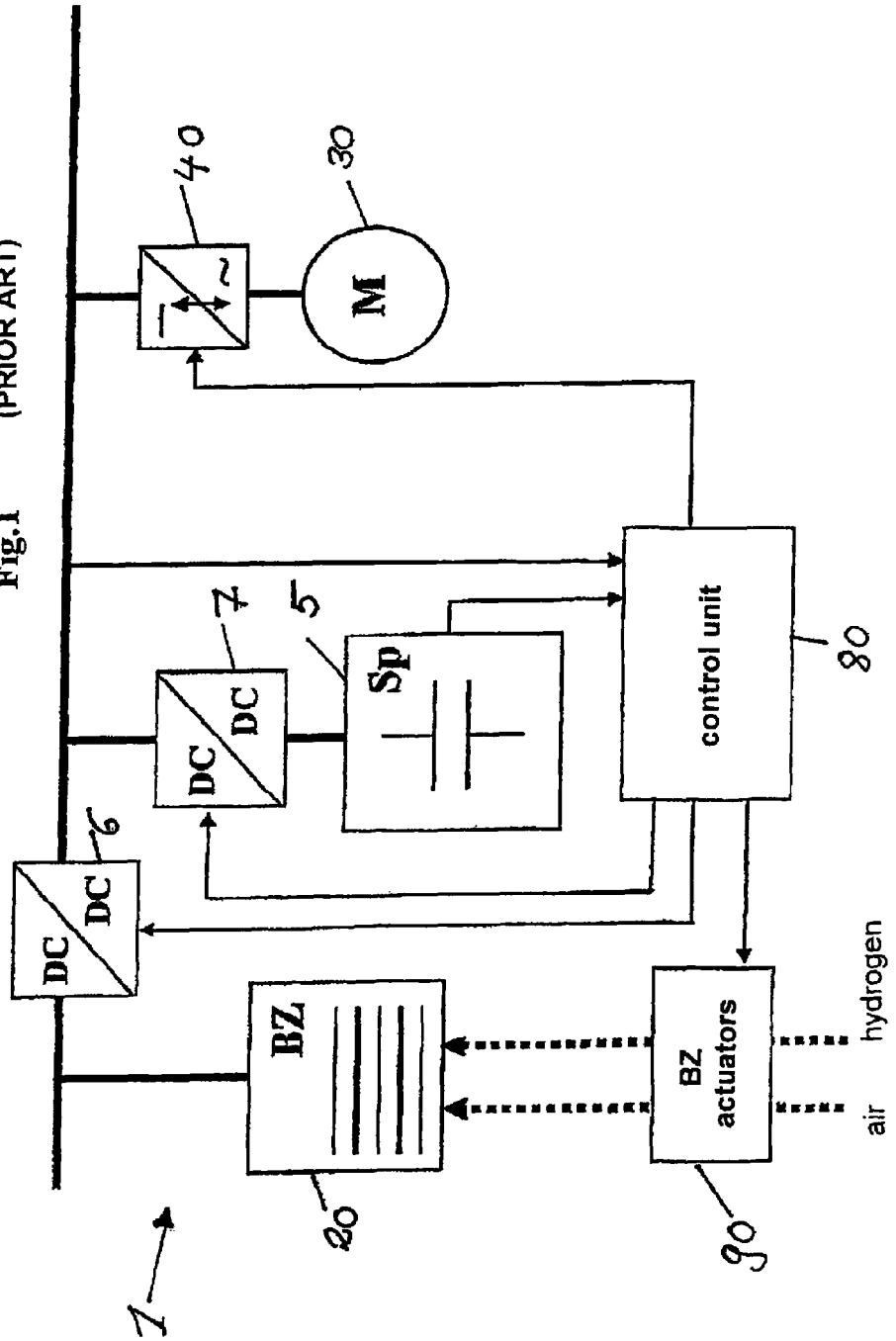
FIG. 1: shows a circuit diagram of a drive system according to the prior art.

FIG. 1 shows a drive system 1 with a fuel cell known from the prior art. The drive system 1 provides an AC motor 30, which drives a machine or the like. As primary energy source a fuel cell unit 20 is used, which in contrast to a diesel generator unit achieves a distinctly higher efficiency.

For energy recovery, the AC motor 30 operates in the generator mode and feeds the recovered energy into the electric energy storage unit 5 via the bidirectional DC/DC converter 7. The interposed inverter 40 converts the generated DC voltage of the fuel cell unit into the required operating AC voltage of the AC motor 30.

The fuel cell unit 20 feeds the AC motor 30 via the unidirectional DC/DC converter 6. In the case of an increased power consumption of the AC motor 30, the required power demand is covered simultaneously by the fuel cell unit 20 and the electric energy storage unit 5. The mutual decoupling of the two energy sources is achieved by the interconnected DC/DC converters 6, 7. On the one hand, the energy storage unit 5 can be charged via the AC motor 30 in the generator mode, on the other hand it can be provided that charging of the electric energy storage unit 5 during certain crane phases is effected via the connection of the two DC/DC converters 6, 7 by means of the fuel cell unit 20.

For controlling the drive system 1, the central control unit 80 is provided. For this purpose, the control unit 80 receives internal operating parameters of the drive system 1, which include both information on the current charging condition of the energy storage unit 5 and information on the intermediate circuit voltage $U_{ZK}$ applied between the DC/DC converters 6, 7 and the inverter 40. In dependence on these parameters, the actuation of the actuators 90 integrated within the fuel cell unit 20 is effected. In this way, for example, the generated DC voltage can be influenced at the outlet of the fuel cell unit 20. Furthermore, the control unit 80 provides a possibility for adjustment of the two DC/DC converters 6, 7 and for influencing the inverter 40 for operation of the AC motor 30.

Figure 2:
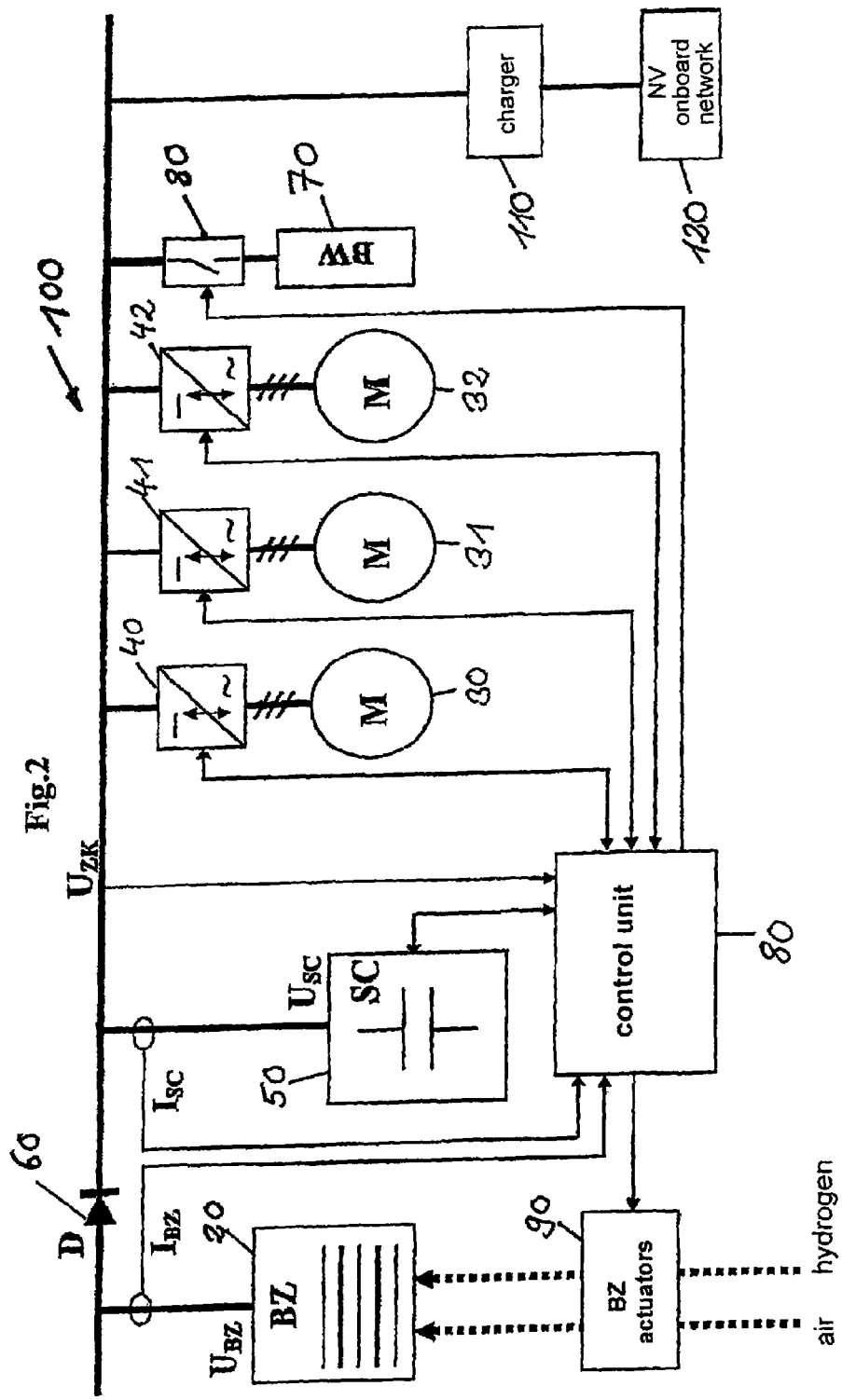
FIG. 2: shows a circuit diagram of the drive system according to the invention.

The drive system 100 according to the invention is shown in FIG. 2 and for example serves for driving a crane. The illustrated drive system 100 describes a simplified solution for a fuel cell-powered crane with electric energy storage system for energy recovery. The proposed configuration of the drive system 100 according to the invention is distinctly simplified as compared to the fuel cell-powered drive 1 of FIG. 1, since the expensive and bulky DC/DC converters 6, 7 are omitted. The proposed arrangement according to FIG. 2 consists of a fuel cell unit 20, a supercapacitor unit 50, a braking resistor 70 and the electric drives 30, 31, 32. The illustrated drives for example are responsible for driving the hoisting gear, the traveling gear or other crane components.

All three drive motors 30, 31, 32 are configured as AC motors, which are connected to the DC network of the intermediate circuit voltage $U_{ZK}$ of the drive system 100 via the inverters 40, 41, 42. The required energy for the drives 30, 31, 32 during the crane movement by means of the crane traveling gear or a trolley or during the hoisting operation of the hoisting gear chiefly is supplied by the supercapacitor unit 50. In the braking mode or when lowering a load suspended on the hoisting cable, all of the individual drives 30, 31, 32 or a part thereof charge the capacitor unit 50, in that the drive motors 30, 31, 32 operate as energy generators.

For the protection of the components incorporated in the drive system 100, the braking resistor 70 optionally can be interconnected with the intermediate circuit voltage of the drive system 100 via the switch 80, if the supercapacitor unit 50 already is charged completely during the generator mode of the drives 30, 31, 32.

To prevent the feeding back of energy into the fuel cell unit 20 during the generator mode of the drives 30, 31, 32, the diode module 60 is connected in series with the fuel cell unit 20. The alignment of the diode module 60 in blocking direction inhibits the current flow to the fuel cell unit 20.

Furthermore, the charger 110 serves for feeding an externally arranged on-board network 120, which accomplishes the supply of arbitrary small components of the crane, in particular of the control unit 80. Since such on-board network 120 generally operates in the low-voltage range, the on-board-network battery of the on-board network 120 is connected to the intermediate circuit voltage $U_{ZK}$ of the drive system 100 via the charger 110.

The fuel cell unit 20 and the supercapacitor unit 50 have different voltage profiles, which is why a direct parallel connection of these units leads to an increased load of the two components. In fuel cells, a voltage drop of 40% of the intermediate circuit voltage $U_{ZK}$ normally is assumed during the full load operation. At the same time, a voltage drop of 50% of the intermediate circuit voltage $U_{ZK}$ is obtained at the supercapacitor unit 50 during the full load operation. Consequently, a voltage difference of 10% is obtained between the two components 20, 50 within the parallel connection. Such voltage deviations of energy sources connected in parallel lead to compensating currents which due to the extremely low internal resistances of the supercapacitor unit 50 and the fuel cell unit 20 cause a considerable current flow. It is necessary to limit the occurring current values, in order to avoid damages of the components of the drive 100 according to the invention. In accordance with the invention, this is effected by the proper dimensioning of the supercapacitor unit 50 used. The voltage difference between the voltage drop $U_{SC}$ at the capacitor unit 50 during full load, i.e. with a totally discharged capacitor, and the voltage drop $U_{BZ}$ at the fuel cell unit 20 is minimized. The reduction of the occurring voltage difference limits the generated charging current $I_{SC}$ of the capacitor unit 50 or the current $I_{BZ}$ of the fuel cell unit 20 to an admissible maximum value.

To illustrate the required adaptation of the supercapacitor unit 50, the following example should be mentioned. What is sought is the proper dimensioning of the capacitor unit 50, which in the totally discharged condition of the capacitor unit 50 effects a voltage drop $U_{SC}=X\%\ U_{ZK}$ at the capacitor unit 50. Proceeding from a maximally loaded fuel cell unit 20 with a voltage drop $U_{BZ}=60\%\ U_{ZK}$, a charging current $I_{SC}$ of the capacitor unit 50 or the current $I_{BZ}$ generated by the fuel cell unit 20 is obtained from the equation:

$$I_{BZ,SC} = \frac{U_{BZ}-U_{SC}}{R_{BZ}+R_{SC}} = \frac{(60-X) \times U_{ZK}}{100 \times (R_{BZ}-R_{SC})} \leq I_{BZ,Max}, I_{SC,Max}$$

The factor X here represents the percentage of the voltage drop obtained at the supercapacitor unit 50. This factor involves a dependence on the dimensioning of the supercapacitor unit 50, wherein above all the capacitance of the capacitor unit 50 represents an essential influencing factor. Accordingly, the same must be defined such that the condition calculated above is satisfied.

When designing the supercapacitor unit 50, it normally is assumed that the desired energy demand is covered with 75% of the stored energy. This condition corresponds to a voltage swing of 50% of the intermediate circuit voltage $U_{ZK}$, which is obtained between the parallel connection and the inverter 40, 41, 42 of the drive motors 30, 31, 32. If the capacitance of the capacitor unit 50 is dimensioned such that the occurring voltage drop at the supercapacitor unit 50 at full load is about 55% of the intermediate circuit voltage $U_{ZK}$ and at the same time a terminal voltage of the fuel cell unit 20 $U_{BZ}=60\%\ U_{ZK}$ is specified, a minimum voltage difference of 5% is obtained between the two components. Such arrangement provides for a 70% utilization of the maximally stored energy. As compared to the service output of 75% with a circuit arrangement as shown in FIG. 1, the same turns out to be minimally lower by comparison, but nevertheless is particularly advantageous with regard to the saving of costs with respect to the omission of the two DC/DC converters 6, 7. As compared to this, the required 5% increase in capacitance of the supercapacitor unit 50 used is not disadvantageous either.

The voltage control of the intermediate circuit voltage $U_{ZK}$ is carried out by means of the control unit 80 by the continuous control of the fuel cell unit 20 in dependence on the load profile, the maximum admissible load of the fuel cell unit and the charging condition of the supercapacitor unit 50.

An alternative configuration of the drive system according to the invention is realized as shown in FIG. 3. The illustrated circuit diagram of the drive system 200 substantially corresponds to the configuration of FIG. 2. Instead of the direct introduction of hydrogen, the fuel cell unit 20 is equipped with a reformer 130. As a result, the fuel cell unit 20 can be operated with conventional fuels, such as hydrocarbonaceous gases or liquids. Furthermore, a control of the reformer used is possible by the control unit 80.

The invention claimed is:

1. A drive system (100) with energy recovery for driving a machine, in particular for driving a crane, wherein the drive system (100) includes at least one fuel cell unit (20), at least one capacitive energy storage unit (50) and at least one drive motor (30, 31, 32), and wherein the fuel cell unit (20) and the energy storage unit (50) are connected in parallel and feed at least one drive motor (30, 31, 32), wherein
   the capacitive energy storage unit (50) is dimensioned such that the differential voltage occurring during operation between the fuel cell unit (20) and the capacitive energy storage unit (50) is minimized to such an extent that the current caused by the voltage within the parallel connection of fuel cell unit (20) and energy storage unit (50) does not exceed a defined safe limit value, wherein the fuel cell unit (20) and the energy storage unit (50) are directly coupled with each other and with the remaining drive components without DC/DC converter.

2. The drive system according to claim 1, wherein the capacitive energy storage unit (50) is a supercapacitor unit whose capacitance is adapted correspondingly.

3. The drive system according to claim 2, wherein a diode module (60) is connected in series with the fuel cell unit (20).

4. The drive system according to claim 3, wherein at least one further separate electric energy accumulator (120) is provided, which via a charger (110) is supplied with the intermediate circuit voltage $U_{ZK}$.

5. The drive system according to claim 3, wherein a switchable braking resistor (70) is provided for destroying generated electric energy.

6. The drive system according to claim 4, wherein a switchable braking resistor (70) is provided for destroying generated electric energy.

7. The drive system according to claim 2, wherein at least one further separate electric energy accumulator (120) is provided, which via a charger (110) is supplied with the intermediate circuit voltage $U_{ZK}$.

8. The drive system according to claim 7, wherein a switchable braking resistor (70) is provided for destroying generated electric energy.

9. The drive system according to claim 1, wherein a diode module (60) is connected in series with the fuel cell unit (20).

10. The drive system according to claim 9, wherein at least one further separate electric energy accumulator (120) is provided, which via a charger (110) is supplied with the intermediate circuit voltage $U_{ZK}$.

11. The drive system according to claim 10, wherein a switchable braking resistor (70) is provided for destroying generated electric energy.

12. The drive system according to claim 1, wherein at least one further separate electric energy accumulator (120) is provided, which via a charger (110) is supplied with the intermediate circuit voltage $U_{ZK}$.

13. The drive system according to claim 1, wherein a switchable braking resistor (70) is provided for destroying generated electric energy.

14. The drive system according to claim 12, wherein a switchable braking resistor (70) is provided for destroying generated electric energy.

15. The drive system according to claim 1, wherein a control unit (80) is provided for controlling the intermediate circuit voltage $U_{ZK}$.

16. The drive system according to claim 15, wherein the control unit (80) is configured such that the control is effected in dependence on the load profile and/or the maximum admissible load of the fuel cell unit (20) and/or the charging condition of the supercapacitor unit (50).

17. The drive system according to claim 1, wherein the fuel cell unit (20) includes a reformer (130).

18. A machine with a drive system (100) for operation of the machine, wherein the drive system (100) includes at least one drive motor (30, 31, 32), wherein
the drive system (100) is configured according to claim 1.

19. The machine according to claim 18, wherein the fuel cell unit (20) and/or the energy storage unit (50) represent the primary energy source of the machine.

20. The machine according to claim 18, wherein the machine is a crane, in particular a container or deck crane.

* * * * *